(12) United States Patent
Bloebaum

(10) Patent No.: US 7,996,015 B2
(45) Date of Patent: Aug. 9, 2011

(54) LOCATION-BASED TAGGING AND SORTING OF CONTENT ON A MOBILE DEVICE

(75) Inventor: L. Scott Bloebaum, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 412 days.

(21) Appl. No.: 12/252,185

(22) Filed: Oct. 15, 2008

(65) Prior Publication Data

US 2010/0093365 A1 Apr. 15, 2010

(51) Int. Cl.
*H04W 24/00* (2009.01)
(52) U.S. Cl. .............. 455/456.1; 455/456.3; 455/457; 455/452.2; 455/440; 455/441
(58) Field of Classification Search ............ 455/456.1, 455/456.3, 457, 452.2, 440, 441
See application file for complete search history.

(56) References Cited

U.S. PATENT DOCUMENTS

| | | | |
|---|---|---|---|
| 6,442,479 | B1 | 8/2002 | Barton |
| 6,785,551 | B1 | 8/2004 | Richard |
| 6,912,398 | B1 | 6/2005 | Domnitz |
| 7,343,564 | B2 | 3/2008 | Othmer |
| 2002/0039203 | A1 | 4/2002 | Endo et al. |
| 2006/0080286 | A1 | 4/2006 | Svendsen |
| 2007/0043748 | A1 | 2/2007 | Bhalotia |
| 2007/0208749 | A1 | 9/2007 | Price et al. |
| 2008/0045236 | A1 | 2/2008 | Nahon et al. |
| 2008/0081640 | A1 | 4/2008 | Tran et al. |
| 2008/0155453 | A1 | 6/2008 | Othmer |
| 2008/0194270 | A1 | 8/2008 | Greenberg |

FOREIGN PATENT DOCUMENTS

| | | |
|---|---|---|
| EP | 1 553 788 A1 | 7/2005 |
| WO | 2007030897 A1 | 3/2007 |

OTHER PUBLICATIONS

International Search Report and Written Opinion dated Dec. 15, 2009 issued in corresponding PCT application No. PCT/US2009/043574, 15 pages.
International Preliminary Report on Patentability dated Jan. 11, 2011 issued in corresponding PCT application No. PCT/US2009/043574, 9 pages.

*Primary Examiner* — David Q Nguyen
(74) *Attorney, Agent, or Firm* — Snyder, Clark, Lesch & Chung, LLP

(57) ABSTRACT

A mobile device a location module configured to determine a location of the mobile device, a controller configured to tag content with a creation location of the mobile device when the content is created using the mobile device, and memory configured to store the tagged content. The controller is configured to sort the tagged content based upon the creation location with respect to a specific location. Also, a mobile device is provided that includes a location module configured to determine a location of the mobile device, a controller configured to tag content with a receipt location of the mobile device when the content is received by the mobile device, and memory configured to store the tagged content.

25 Claims, 3 Drawing Sheets

LOCATION-BASED TAGGING AND SORTING OF CONTENT ON A MOBILE DEVICE

TECHNICAL FIELD

The present disclosure relates to mobile devices and, more particularly, to tagging and sorting of content on the mobile device.

BACKGROUND

Lifestyles have become increasingly reliant on mobile communications. Wireless communication devices, such as cellular phones, laptop computers, pagers, personal communication systems (PCS), personal digital assistants (PDA), and the like, provide advantages of ubiquitous communication without geographic or time constraints. Such mobiles devices are equipped with various components that allow a user to create and store different types of content, and to receive and store content from other users. For example, many mobile devices include software that allows the user to create various data files, cameras that allow a user to take pictures or video, and communication devices that allow users to download various content to the mobile device.

With the ever increasing ability to create and receive various forms of content using a mobile device, users can become overwhelmed by the volume of information stored on such a device. Accordingly, a need exists for new ways of sorting content that allows a user a convenient manner of retrieving such stored information.

DISCLOSURE

The above described needs are fulfilled, at least in part, by providing an embodiment of a mobile device that, for example, advantageously includes a location module configured to determine a location of the mobile device, a controller configured to tag content with a creation location of the mobile device when the content is created using the mobile device, and memory configured to store the tagged content, where the controller is configured to sort the tagged content based upon the creation location with respect to a specific location.

An additional advantageous embodiment provides a mobile device including a location module configured to determine a location of the mobile device, a controller configured to tag content with a receipt location of the mobile device when the content is received by the mobile device, and memory configured to store the tagged content.

A further advantageous embodiment provides a method of tagging content for sorting using a mobile device, where the method includes determining a creation location of the mobile device when content is created using the mobile device, tagging the content with the creation location, storing the tagged content, and sorting the tagged content based upon the creation location with respect to a specific location.

And a further advantageous embodiment provides a method of tagging content for sorting using a mobile device, where the method includes determining a receipt location of the mobile device when content is received by the mobile device, tagging the content with the receipt location, and storing the tagged content.

Additional advantages of the present disclosure will become readily apparent to those skilled in this art from the following detailed description, wherein preferred embodiments of the disclosure is shown and described, simply by way of illustration of the best mode contemplated. As will be realized, the disclosure is capable of other and different embodiments, and its several details are capable of modifications in various obvious respects. Accordingly, the drawings and description are to be regarded as illustrative in nature, and not as restrictive.

DETAILED DESCRIPTION

Figure 1:
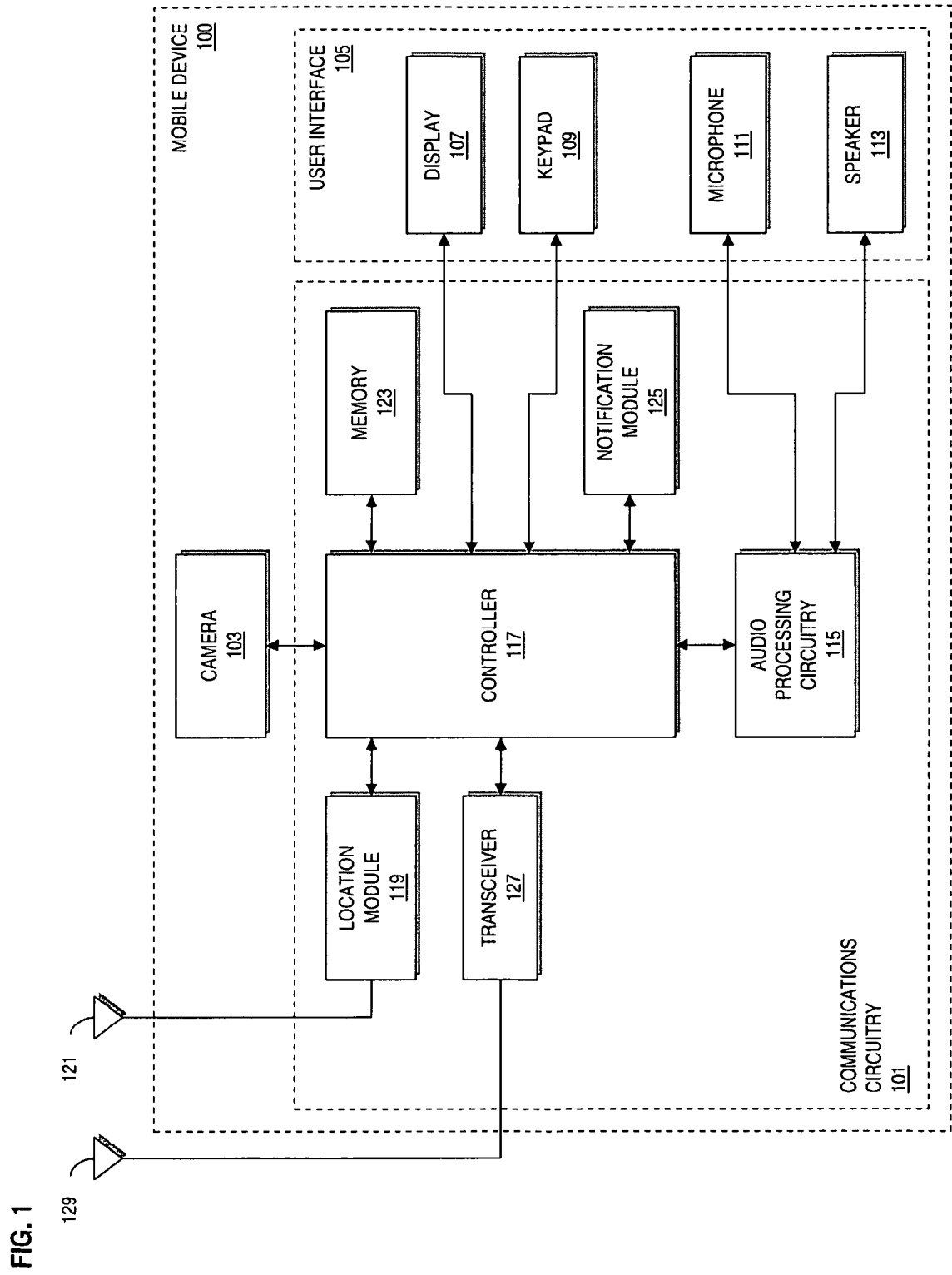
FIG. 1 is a block diagram of a mobile device, according to an exemplary embodiment.

Embodiments of the present disclosure will be described hereinafter with reference to the accompanying drawings. In the following description, the constituent elements having substantially the same function and arrangement are denoted by the same reference numerals, and repetitive descriptions will be made only when necessary.

The embodiments of the invention described below provide for the advantageous integration of location determination capability with other features or applications in a mobile device. More particularly, the embodiments provide for the utilization of location-based information to sort content contained in a mobile device. This function provides a new context in which to sort, organize, and present information in a way that is beneficial in many situations encountered by a user of a mobile device.

FIG. 1 is a block diagram of a mobile device 100, according to an exemplary embodiment. While the embodiment depicted in FIG. 1 is generally provided in the form of a wireless telephony device, the mobile device can be any wireless two-way communicator. For example, mobile device can be a portable laptop device, a cellular phone, a two-way trunked radio, a combination cellular phone and personal digital assistant (PDA), a smart phone, a cordless phone, a satellite phone, or any other suitable mobile device with telephony capabilities, such as a mobile computing device. Mobile device may also correspond to suitable portable objects, devices, or appliances including a transceiver, such as a wireless fidelity (WiFi) transceiver, a worldwide interoperability for microwave access (WiMAX) transceiver, and the like.

Mobile device 100 depicted in FIG. 1 includes communications circuitry 101, a camera 103, and user interface 105. User interface 105 includes display 107, keypad 109, microphone 111, and speaker 113. Display 107 provides a graphical interface that permits a user of mobile device 100 to view dialed digits, call status, menu options, and other service information. The graphical interface may include icons and menus, as well as other text and symbols. Keypad 109 includes an alphanumeric keypad and may represent other input controls, such as a joystick, button controls, touch panel, dials, etc. The user thus can construct user profiles, enter commands, initialize applications, input remote addresses, and select options from menu systems. Microphone 111 converts spoken utterances of a user into electronic audio signals, while speaker 113 converts audio signals into audible sounds.

Communications circuitry 101 includes audio processing circuitry 115, controller 117, location module 119 (such as GPS receiver) coupled to antenna 121, memory 123, notification module 125, and transceiver 127 coupled to antenna 129. Memory 123 may represent a hierarchy of memory, which may include both random access memory (RAM) and read-only memory (ROM). Computer program instructions, and corresponding data for operation can be stored in non-volatile memory, such as erasable programmable read-only memory (EPROM), electrically erasable programmable read-only memory (EEPROM), and/or flash memory. Memory 123 may be implemented as one or more discrete devices, stacked devices, or integrated with controller 117. Memory 123 may store information, such as one or more user profiles, one or more user defined policies, one or more contact lists, photos, videos, etc.

Controller 117 controls the operation of mobile device 100 according to programs and/or data stored to memory 123. Control functions may be implemented in a single controller or via multiple controllers. Suitable controllers may include, for example, both general purpose and special purpose controllers and digital signal processors. Controller 117 may interface with audio processing circuitry 115, which provides basic analog output signals to speaker 113 and receives analog audio inputs from microphone 111. Controller 117, as will be described in more detail below, is configured to execute a content tagging and sorting application stored to memory 123.

In this embodiment, the mobile device 100 includes a location module 119, which can be comprised of one or more location-determination technologies, including Global Positioning System (GPS), assisted GPS (A-GPS), or network-centric technologies by which the location is determined from measurements made on terrestrial communication signals (e.g., cellular or digital television signals) by the mobile device 100 or a network with which mobile device 100 communicates. The location module 119 embodying such technologies may be capable of being disabled by the user or in certain circumstances; however, preferably at least one of the location-determination technologies comprising location module 119 is enabled during normal use of the mobile device 100.

The position of mobile device 100 is monitored, for example, through GPS technologies that utilize a system of orbital satellites to determine positioning information. For example, a GPS receiver, such as location module 119, calculates its position by carefully timing the signals sent by the constellation of GPS satellites high above the Earth. Each satellite continually transmits messages containing the time the message was sent, a precise orbit for the satellite sending the message (the ephemeris), and the general system health and rough orbits of all GPS satellites (the almanac). These signals travel at the speed of light (which varies between vacuum and the atmosphere). The receiver uses the arrival time of each message to measure the distance to each satellite, from which it determines the position of the receiver (conceptually the intersection of spheres). The resulting coordinates are converted to more user-friendly forms such as latitude and longitude, or location on a map, then displayed to the user. Accordingly, the spatial position of the receiving antenna can be determined with great accuracy and convenience.

Figure 2:
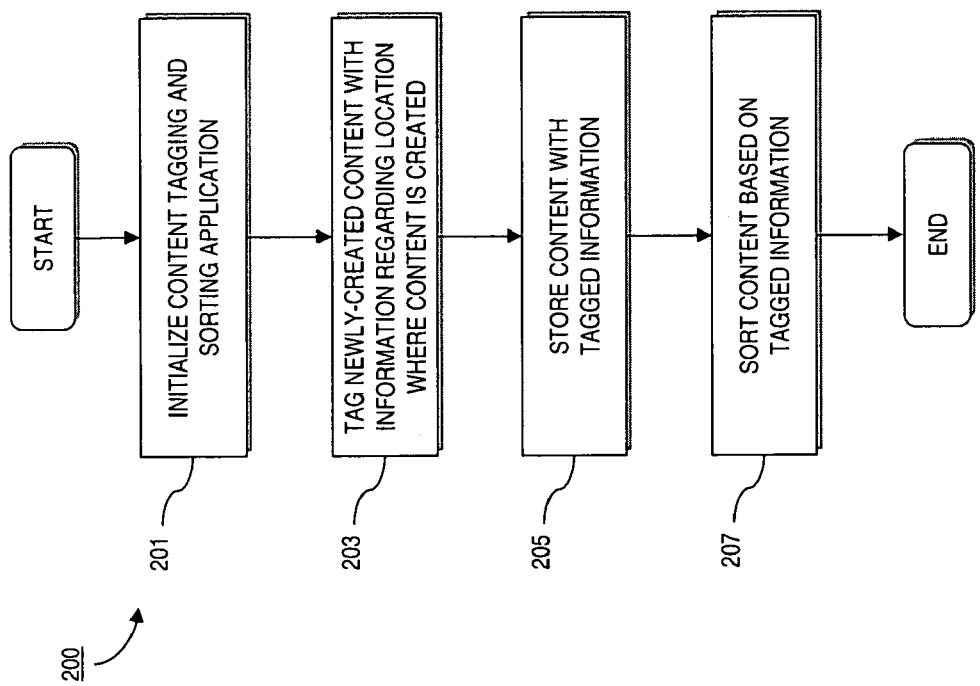
FIG. 2 is a flowchart of a process for tagging and sorting newly-created content, according to an exemplary embodiment.

FIG. 2 is a flowchart of a process 200 for tagging and sorting newly-created content, according to an exemplary embodiment. The process 200 begins with the initialization of the content tagging and sorting application in step 201. The mobile device can be automatically configured to initialize this application upon powering up of the mobile device, or the mobile device can be configured to allow the user to initialize the application. For example, the user can set preferences in the mobile device that determines when and how the application is initialized, and defines various operation parameters under which the application operates.

In step 203, any newly-created content will be tagged with information regarding the geographic location of the mobile device at the time that the content was created. For example, a user of the mobile device creates content (e.g., takes a photograph or a video, records an audio memo, creates a new contact list entry, creates a new document, etc.), and the newly-created content is then tagged with metadata indicating the location where the content was created. Thus, at the time the content is created, the controller 117 can use the location module 119 to determine the geographic location of the mobile device 100 at that time, and then tag the content with that information, hereinafter referred to as the creation location information. Next, in step 205, the content with the tagged information can be stored in a file system of the memory 123.

In step 207, the stored tagged information can be sorted based on the tagged information to allow the user to retrieve the content using that tagged information. For example, the user can have the controller sort the various contents stored on the mobile device by location of the creation of the content, such as photographs taken in Miami, Fla., or contact list entries entered in Dallas, Tex. Alternatively, the content can be sorted based on the location of the creation of the content as it relates to the current location of the mobile device. For example, the user can request the controller 117 to use the location module 119 to determine the current location of the mobile device 100, and then sort the content based on the distance between the location at which it was created (e.g., using the stored metadata) and the current location. For example, controller 117 may create a list of the content that begins with content created at a location nearest to the current location and ends with content created at a location farthest from the current location. As a further example, controller 117 may create a list of all content created within a certain radial distance from the current location. The manner in which the content is sorted can be selected by the user in order to provide him or her with the ability to sort out content based on relevant and/or preferred criteria. The user also may limit or restrict population of the list to certain types of content, or otherwise by values of one or more fields in the metadata associated with the content items.

Figure 3:
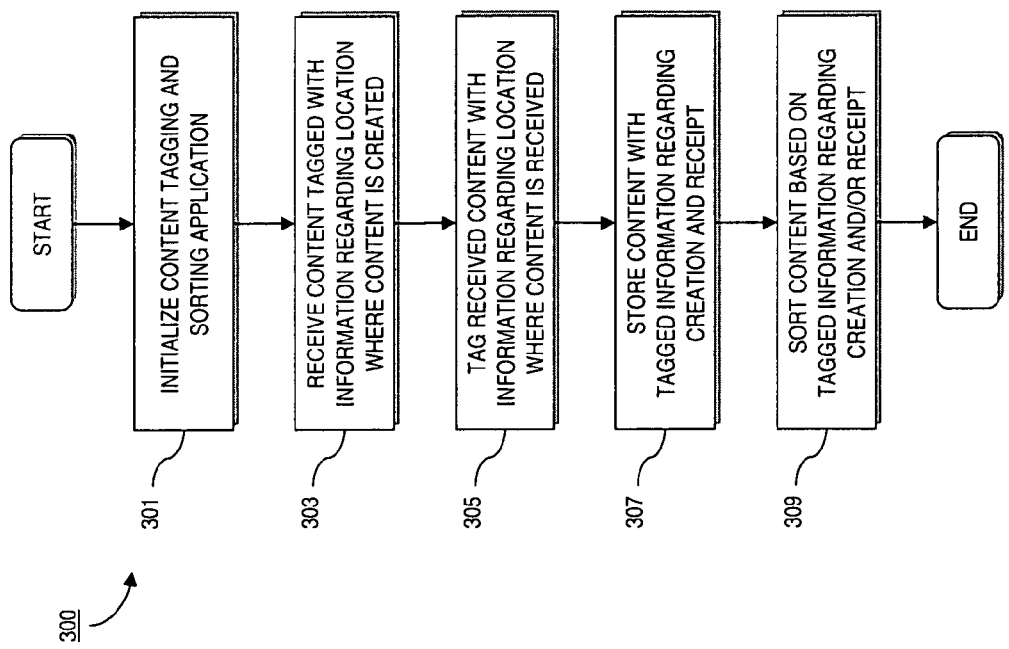
FIG. 3 is a flowchart of a process for tagging and sorting received content, according to an exemplary embodiment.

FIG. 3 is a flowchart of a process 300 for tagging and sorting received content, according to an exemplary embodiment. The process 300 begins with the initialization of the content tagging and sorting application in step 301. The mobile device can be automatically configured to initialize this application upon powering up of the mobile device, or the mobile device can be configured to allow the user to initialize the application.

In step 303, the mobile device 100 receives content that is tagged with information regarding the geographic location where the content was created. Thus, in a situation where the user receives content from another user or content created using another device, and in which the content has been tagged with information regarding the location at which the content was created, then the mobile device 100 can receive such information. In addition to the tagged information regarding creation, the mobile device 100 in step 305 can also tag the received content with information regarding the location where the content was received by the mobile device 100 using the location module 119 and controller 117, hereinafter referred to as the receipt location information. Then, in step 307, the content with the tagged creation and receipt information can be stored in a file system of the memory 123.

Then, the stored tagged information can be sorted based on the tagged information in step 307 to allow the user to retrieve the content using that tagged information. For example, the user can have the controller sort the various content stored on the mobile device by creation location information and/or by the receipt location information. For instance, the content can be sorted based on the distance between mobile device 100's current location or another user-specified location (e.g., selected from a list of favorites) and either the creation location information, the receipt location information, or a combination thereof. Hence, the manner in which the content is sorted can be selected by the user in order to provide the user with the ability to sort out content based on relevant criteria defined by the user.

Thus, in the manner described above, the user can receive content from an external source that already has location metadata associated with it (e.g., where created). Furthermore, the user can optionally associate additional location metadata with the content (e.g., where received—based on user's current location), and then store the content and associated information in the file system of the mobile device.

When the user wishes to access or view a directory of some or all of the content stored on the mobile device, the file system manager can present the user with sorting options, one of which is by proximity to a specific location (e.g., the current location of the mobile device, a selected location such as work address, home address, etc.). If the user chooses this option, the file system manager sorts the files into groups based on proximity (e.g., <100 m, <1 km, <10 km, etc.) to the current location of the mobile device or to some other selected location, and presents the list of groups to the user. Files without location metadata can be presented in their own appropriately-labeled group or omitted from the list of groups presented to the user. If a particular file has multiple location metadata elements associated with it, the file system manager may utilize some or all of these in the determination of which group to place this element. The user may enable, disable, or configure various parameters related to the operation of this process. Alternately, the file system manager may organize the content based on distance from and orientation with respect to mobile device 100's current location or another user-specified location, such that the controller 117 may display the content list in a two-dimensional, map-like arrangement.

It should be noted that the exemplary embodiments depicted and described herein set forth the preferred embodiments of the present disclosure, and are not meant to limit the scope of the claims hereto in any way. Numerous modifications and variations of the present disclosure are possible in light of the above teachings. It is therefore to be understood that, within the scope of the appended claims, the disclosed concepts may be practiced otherwise than as specifically described herein.

What is claimed is:

1. A mobile device comprising:
    a location module configured to determine a location of the mobile device;
    a first memory to store tagged contents, wherein the tagged contents include contents and one or more locations pertaining to the contents;
    a second memory to store instructions;
    a controller to execute the instructions that configure the controller to:
        receive content with a tagged creation location corresponding to a location where the received content was created by another device;
        tag the received content with a received location corresponding to a location where the mobile device is at the time of receiving the received content, wherein the received location is a location different from the creation location;
        store the received tagged content in the first memory;
        receive a user-specified location, wherein the user-specified location is a location different from the creation location and the received location; and
        sort the received tagged content relative to other tagged contents stored in the first memory based on a distance and an orientation from the user-specified location to one of the creation location or the received location; and
    a display to:
        display a sort result that includes at least one of the received tagged content or one or more of the other tagged contents based on the distance and the orientation from the user-specified location to the one of the creation location or the received location.

2. The mobile device according to claim 1, wherein the controller is further configured to:
    receive a user-specified radial distance value that limits a distance from the user-specified location, wherein the radial distance pertains to sorting the received tagged content and the other tagged contents, wherein when sorting, the controller is further configured to:
    sort the received tagged content and the other tagged contents based on the user-specified radial distance value and the orientation from the user-specified location to one of the creation location or the received location, and wherein when displaying, the display is further configured to:
    display a sort result in correspondence to a sorting based on the user-specified radial distance value.

3. The mobile device according to claim 1, wherein the controller is further configured to:
    receive a user-specified type-of-content limiter that limits a type of content to be sorted, wherein when sorting, the controller is further configured to:
    sort the received tagged content and the other tagged contents based on the user-specified type-of-content limiter and the orientation from the user-specified location to one of the creation location or the received location, and wherein when displaying, the display is further configured to:
    display a sort result in correspondence to a sorting based on the user-specified type-of-content limiter.

4. The mobile device according to claim 1, wherein when sorting and displaying, the user-specified location is a current location of the mobile device.

5. The mobile device according to claim 1, wherein when sorting, the controller is further configured to:
    sort the received tagged content and the other tagged contents based on the creation location, the received location, and the user-specified location, and wherein when displaying, the display is further configured to:
    display a sort result, in correspondence to a sorting based on the creation location, the received location, and the user-specified location.

6. The mobile device according to claim 1, wherein the controller is further configured to:
    create a new content; and
    tag the new content with a creation location.

7. The mobile device according to claim 1, wherein the user-specified location is a user's work address or a user's home address.

8. The mobile device according to claim 1, wherein the mobile device comprises a wireless telephone.

9. The mobile device according to claim 1, wherein the the sort result is displayed in a two-dimensional, map arrangement.

10. A method comprising:
storing, by a mobile device, tagged contents, wherein the tagged contents include contents and one or more locations pertaining to the contents;
receiving content with a creation location corresponding to a location where the received content is created;
tagging the received content with a received location corresponding to a location where a mobile device is at the time of receiving the received content, wherein the received location is a location different from the creation location; storing the received tagged content;
receiving a user-specified location, wherein the user-specified location is a location different from the creation location and the received location;
sorting the received tagged content relative to the tagged contents based on a distance and an orientation from the user-specified location to one of the creation location or the received location; and
displaying a sort result that includes at least one of the received tagged content or one or more of the other tagged contents based on the distance and the orientation from the user-specified location to the one of the creation location or the received location.

11. The method of claim 10, further comprising:
receiving a user-specified radial distance value that limits a distance from the user-specified location, wherein the radial distance pertains to sorting the received tagged content and the other tagged contents, wherein the sorting further comprises:
sorting the received tagged content and the other tagged contents based on the user-specified radial distance value and the orientation from the user-specified location to one of the creation location or the received location, and wherein the displaying further comprises:
displaying a sort result in correspondence to a sorting based on the user-specified radial distance value.

12. The method of claim 10, further comprising:
receiving a user-specified type-of-content limiter that limits a type of content to be sorted, wherein the sorting further comprises:
sorting the received tagged content and the other tagged contents based on the user-specified type-of-content limiter and the orientation from the user-specified location to one of the creation location or the received location, and wherein the displaying further comprises:
displaying a sort result in correspondence to a sorting based on the user-specified type-of-content limiter.

13. The method of claim 10, further comprising:
determining a current location of a mobile device, wherein the user-specified location is the current location of the mobile device.

14. The method of claim 10, wherein the sorting further comprises:
sorting the received tagged content and the other tagged contents based on the creation location, the received location, and the user-specified location, and wherein the displaying further comprises:
displaying a sort result in correspondence to a sorting based on the creation location, the received location, and the user-specified location.

15. The method of claim 10, further comprising:
creating a new content; and
tagging the new content with a creation location.

16. The method of claim 10, wherein the user-specified location is a user's work address or a user's home address.

17. The method of claim 10, wherein the sort result is displayed in a two-dimensional, map-like arrangement, and the method further comprising:
displaying a list of favorite locations;
receiving a user selection of one of the favorite locations; and
assigning the one of the favorite locations as the user-specified location.

18. A tangible computer-readable medium comprising instructions for:
receiving content with a creation location corresponding to a location where the received content is created;
tagging the received content with a received location corresponding to a location where a mobile device is at the time of receiving the content, wherein the received location is a location different from the creation location;
storing the received tagged content;
receiving a user-specified location, wherein the user-specified location is a location different from the creation location and the received location;
sorting the received tagged content relative to other tagged contents stored in the first memory based on a distance and an orientation from the user-specified location to one of the creation location or the received location; and
displaying a sort result that includes at least one of the received tagged content or one or more of the other tagged contents based on the distance and the orientation from the user-specified location to the one of the creation location or the received location.

19. The tangible computer-readable medium of claim 18, further comprising instructions for:
receiving a user-specified radial distance value that limits a distance from the user-specified location, wherein the radial distance pertains to sorting the received tagged content and the other tagged contents, wherein the sorting further comprises:
sorting the received tagged content and the other tagged contents based on the user-specified radial distance value and the orientation from the user-specified location to one of the creation location or the received location, and wherein the instructions for displaying further comprise instructions for:
displaying a sort result in correspondence to a sorting based on the user-specified radial distance value.

20. The tangible computer-readable medium of claim 18, further comprising instructions for:
receiving a user-specified type-of-content limiter that limits a type of content to be sorted, wherein the sorting further comprises:
sorting the received tagged content and the other tagged contents based on the user-specified type-of-content limiter and the orientation from the user-specified location to one of the creation location or the received location, and wherein the instructions for displaying further comprise instructions for:
displaying a sort result in correspondence to a sorting based on the user-specified type-of-content limiter.

21. The tangible computer-readable medium of claim 18, further comprising instructions for:
creating a new content; and
tagging the new content with a creation location.

22. A mobile device comprising:
- a location module configured to determine a location of the mobile device;
- a first memory to store tagged contents, wherein the tagged contents include contents and one or more locations pertaining to the contents;
- a second memory to store instructions;
- a controller to execute the instructions that configure the controller to:
    - receive content from another mobile device tagged with a creation location corresponding to a location where the received content was created;
    - tag the received content with a received location corresponding to a location where the mobile device is at the time of receiving the content, wherein the received location is a location different from the creation location;
    - store the received tagged content in the first memory; and
    - sort the received tagged content relative to other tagged contents stored in the first memory; and
- a display to:
    - display a sort result that includes at least one of the received tagged content or one or more of the other tagged contents.

23. The mobile device of claim 22, wherein the controller is further configured to:
- receive a user-specified location that is different from the creation location and the received location;
- receive a user-specified radial distance value that limits a distance from the user-specified location, wherein the radial distance pertains to sorting the received tagged content and the other tagged contents, wherein when sorting, the controller is further configured to:
- sort the received tagged content and the other tagged contents based on the user-specified radial distance value and an orientation from the user-specified location to one of the creation location or the received location, and wherein when displaying, the display is further configured to:
- display a sort result in correspondence to a sorting based on the user-specified radial distance value.

24. The mobile device of claim 22, wherein the received content is one of a photograph, a video, an audio memo, or a document.

25. The mobile device of claim 22, wherein the mobile device comprises a wireless telephone.

* * * * *